United States Patent [19]

Forsyth

[11] Patent Number: 4,690,512

[45] Date of Patent: Sep. 1, 1987

[54] COMPOSITE LENS ASSEMBLY

[75] Inventor: Robert P. Forsyth, Lexington, Mass.

[73] Assignee: Polaroid Corporation, Cambridge, Mass.

[21] Appl. No.: 695,238

[22] Filed: Jan. 28, 1985

[51] Int. Cl.⁴ .................... B29D 11/00; G02B 3/00; B32B 7/00
[52] U.S. Cl. ................................ 350/417; 156/310; 350/482
[58] Field of Search ................. 350/482, 417; 156/310

[56] References Cited

U.S. PATENT DOCUMENTS 2,727,843  12/1955  Tillyer .................... 350/482 X
2,909,204  10/1959  Somerville ............. 350/482 X
4,081,581   3/1978  Littell, Jr. ............... 428/412 X Primary Examiner—John K. Corbin
Assistant Examiner—Scott J. Sugarman
Attorney, Agent, or Firm—Karl Hormann

[57] ABSTRACT

A lens assembly, including at least one plastic lens element axially aligned with another lens element of glass or plastic and adhesively bonded together by a polysiloxane room temperature curable cement, the bond between the plastic element and the cement being improved by a primer layer comprising an aliphatic polyurethane.

23 Claims, 1 Drawing Figure

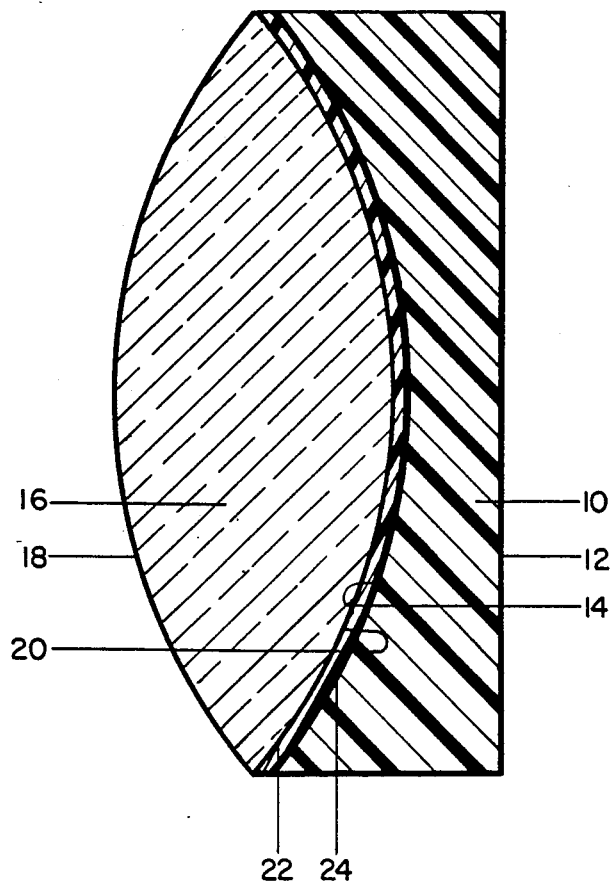

COMPOSITE LENS ASSEMBLY

BACKGROUND OF THE INVENTION

The present invention relates to composite lens assemblies in general, and to such assemblies in which plastic lens elements are adhesively bonded to other plastic lens elements or to glass elements, in particular.

Owing to the fact that plastic lenses possess certain optical qualities, e.g., low light absorption, wide ranges of refractive indices, low weight, susceptibility to mass production at low cost, etc., which cannot readily be matched by glass lenses, it is sometimes desirable or even necessary to assemble plastic lens elements with glass lens elements into symbiotic units of synergistic performance. Where such assemblies require bonding of the plastic and glass elements together by an optical cement, difficulties sometimes arise in establishing or maintaining a physically firm and stable bond between the plastic element and the glass element. That is to say, the plastic and the cement are incompatible in the sense that sooner or later any bond initially established between them may be adversely affected in a manner impairing its optical neutrality. For instance, while as a rule stable bonds may be established between glass elements and optical cements, it has been found that the bonding of plastic elements by optical cements to glass elements or other plastic elements is often impaired by partial or total separation, crazes, fissures or cracks in the cement, etc., for reasons sometimes rooted in their different coefficients of expansion under conditions of changing temperatures or, generally, because of their lack of compatibility. Attempts to improve such bonds between optical cements and plastic lens elements by applying to the surfaces of the plastic lens elements wetting agents as primer layers have hitherto failed to yield satisfactory results.

It is, therefore, an object of the invention to make possible a stable physical bond, by means of a cement, between lens elements comprising plastic and glass, respectively.

Another object of the invention resides in the provision of a substantially stable bond of substantially permanent optical neutrality between lens elements of the kind referred by a room temperature vulcanizable cement.

Yet another object of the invention is to provide permanent adhesive bonds of physical stability between glass and plastic lens elements by simple and inexpensive means.

A still further object of the invention is to provide an improved bond between a cement and a plastic lens element which remains stable even over wide temperature ranges.

Other objects of the invention will in part be obvious and will in part appear below. The invention accordingly comprises the mechanism and system possessing the construction, combination of elements and arrangement of parts which are exemplified in the following specification.

SUMMARY OF THE INVENTION

In the accomplishment of these and other objects, the invention, in its broadest aspect, provides for a bond between a first lens element and a plastic lens element established by a room temperature vulcanizable fluid organopolysiloxane adhesive, preferably of the one-package type, adhering to the facing optical surfaces of the lens elements, in combination with a primer coating of an aliphatic polyurethane on the optical surface of at least the plastic lens element.

DESCRIPTION OF THE DRAWING

The novel features representative of preferred embodiments of the invention are set forth with particularity in the appended claims. The invention itself, however, in respect of its organization and method of operation together with other objects and advantages will be best understood from the following description of an illustrative embodiment and the accompanying drawing which depicts a lens assembly, in longitudinal section, including a plastic lens element and a glass lens element held together by an optically neutral cement, in accordance with the present invention.

DESCRIPTION OF THE PREFERRED EMBODIMENT

The drawing, by way of a preferred embodiment of the invention, depicts a plastic lens element 10 having a planar surface 12 and a concave surface 14. The term "plastic" is here used for convenience to refer to non-glass lens elements of organic polymers, and is intended to include, but not to be limited to, styrene and acrylic resin compounds. Also shown is a biconvex glass lens element 16 adjacent the concave surface 14 of lens element 10. The element 16 may be made of any of the many well-known optical glasses. As will be appreciated by those skilled in the art, the element 16 may also be made of plastic and may in that case be treated in the manner of element 10, in the manner set forth infra. The lens element 16 is provided with symmetrically identical surfaces 18 and 20, the curvature of these surfaces being complementary to the concave surface 14 of element 10. Indeed, the convex surface 20 faces the surface 14 in such a manner that the two lens elements 10 and 16 are coaxially aligned.

The surfaces 14 and 20 are separated by a gap of uniform width, and the gap is filled by a layer of cement 22 which, in the manner described below, maintains the lens elements 10 and 16 in their position relative to each other. Also discernible is a primer layer 24, represented by a thick black line, between the cement 22 and the concave surface 14 of the plastic lens element 10. A similar primer could, of course, be applied to the lens element 16, particularly if the latter were made of plastic.

The curvatures of the surfaces of the lens elements 10 and 16 have been arbitrarily drawn by way of an example only; in praxi, however, any other shapes may be used.

The layer of cement 22 between the lens elements 10 and 16 is applied by any of the methods well known in the art. The cement used in a preferred practice of the instant invention is a one-package room temperature vulcanizable or curable organopolysiloxane compound which is applied in its initially liquid condition. Such curable liquid compositions usually comprise a curing agent and a base mixture and convert or cure to an elastomeric state by exposure to the moisture in the atmosphere. Being initially liquid it is also self-levelling and, therefore, assumes its shape as a layer of uniform thickness by aligning the surfaces 14 and 20 of the lens elements as shown in the drawing. Preferably, the cement is applied to the surface 14 in a quantity sufficient so that after curing it yields a layer having a uniform thickness of between about 0.025 mm and about 0.075 mm. Curing or vulcanizing occurs rapidly; after about half an hour the compound is tacky and after about 24 hours it is cured completely. Different thicknesses of the layer of cement may be used to suit conditions to be met, subject to certain limitation. One such limitation is that the resultant layer be sufficiently ductile or elastic to compensate for differences in the coefficients of expansion of the lens elements to be bonded and thus to contribute to the stability of the resultant bond. Cements which have been found to be useful in the practice of this invention are those described in U.S. Pat. No. 3,382,205, for instance; and in this connection the one-component pourable adhesive sealant marketed by the General Electric Company under the product designation RTV 118 was found to yield particularly satisfactory results. This cement when in its liquid state, i.e., prior to its vulcanization, is translucent but if applied in a quantity resulting in a sufficiently thin layer the translucency has been found not to interfere with the light transmissive qualities of the compound lens.

In accordance with the invention the concave surface 14 of the plastic lens element 10 is treated by an application of a primer comprising an aliphatic polyurethane. Advantageously, the aliphatic polyurethane is furnished as a colloidal dispersion to render its application as a primer easy and convenient. A preferred priming compound is furnished as a colloidal dispersion of the aliphatic polyurethane in an aqueous solution of cellosolve. The cellosolve found to be useful for the purpose of the invention is butyl cellosolve, in a dispersant comprising 20% by volume of cellosolve and 80% by volume of water. A primer which was found to yield excellent results is a clear metallizing top coat lacquer commercially available from the Red Spot Company under its tradename Red Spot X2-99.

The polyurethane dispersion may be applied, by dipping or by spraying, to the surface 14 of the plastic lens 10 and should thereafter be allowed to dry. The cement may then be applied, preferably in liquid condition, to the primed surface 14; and by pressing the glass lens 16 against the concave surface 14 of the plastic lens 10 the cement is spread over both surfaces 14 and 20, thus forming a layer 22 of uniform thickness. Thereafter it is allowed to dry or cure at room temperature, which is completed in about 24 hours or less. Of course, the cement may also be applied to the mating surface of the other lens element, but for reasons of efficiency it is deemed to be desirable to apply it to the concave lens surface. If in liquid form, the cement may be applied in drop form or by spraying, or in any other known manner. The bond established between the cement and the surface 14 of the plastic lens 10 was found to be as physically stable as the bond between the cement and the surface 20 of the glass lens 16, without affecting the optical neutrality of the cement layer 22. The bond, moreover, was found to retain its stability over extended periods of time (in excess of 10 years). While no explanation can be furnished for the superior results attained by the use of the described priming layer on the surface 14 of the plastic lens element 10 as described, it is assumed that the lacquer applied to the surface of the plastic lens influences the molecular structure in such a manner that a firm and stable bond with the silicone adhesive used is established which as experience has shown does not occur in the absence of the primer.

Those skilled in the art will appreciate that in the practice of the invention herein described certain changes in the arrangements referred to may be made without departing from the spirit or scope of the invention. For instance, the invention is equally applicable to joining two plastic lens elements or, for that matter, elements which are not lenses.

What is claimed is:

1. A lens assembly comprising:
   a first lens element having an optical surface of a predetermined configuration;
   a second lens element formed of an organic polymer and having an optical surface facing the optical surface of the first lens element and being of a configuration substantially complementary thereto;
   a substantially uniform layer of room temperature vulcanizable silicone adhesive in contact with the optical surface of the first lens element; and
   a primer coating comprising an aliphatic polyurethane on the optical surface of the second lens element and in contact with the layer of adhesive for providing a physically stable, optically neutral bond between the first and second lens elements.

2. The assembly of claim 1, wherein the first lens element is formed of glass.

3. The assembly of claim 1, wherein the first lens element is formed of an organic polymer and comprises an optical surface facing the optical surface of the second lens element, the optical surface of the first lens element having been treated with a primer comprising an aliphatic polyurethane.

4. The assembly of claim 1, wherein the primer is applied as a colloidal dispersion of an aliphatic polyurethane in an aqueous solution of cellosolve.

5. The assembly of claim 3, wherein the primer is applied as a colloidal dispersion of an aliphatic polyurethane in an aqueous solution of cellosolve.

6. The assembly of claim 4, wherein the primer comprises about 20% by volume of 2-butoxyethanol and about 80% by volume of water.

7. The assembly of claim 4, wherein the primer is applied in liquid form and is allowed to dry before application of the cement.

8. The assembly of claim 5, wherein the primer comprises about 20% by volume of 2-butoxyethanol and about 80% by volume of water.

9. The assembly of claim 5, wherein the primer is applied in liquid form and is allowed to dry before application of the cement.

10. The assembly of claim 1, wherein the cement comprises a room temperature vulcanizable pourable organopolysiloxane compound.

11. The assembly of claim 10, wherein the cement is applied in liquid form to one of the optical surfaces of the first or second lens elements and is spread as a layer of uniform thickness by pressing the lens elements against each other.

12. A lens assembly comprising:
   a glass lens element having an optical surface of a predetermined configuration;
   an organic polymer lens element having an optical surface facing the optical surface of the glass lens element and being of a configuration substantially complementary thereto;
   a substantially uniform layer of room temperature vulcanizable silicone adhesive in contact with the optical surface of the glass lens element; and
   a primer coating comprising an aliphatic polyurethane on the optical surface of the polymer lens element and in contact with the layer of adhesive for providing a physically stable, optically neutral bond between the glass lens element and the polymer lens element.

13. The assembly of claim 12, wherein the primer coating is applied as a colloidal dispersion of an aliphatic polyurethane in an aqueous solution of cellosolve.

14. The assembly of claim 13, wherein the primer comprises about 20% by volume of 2-butoxyethanol and about 80% by volume of water.

15. The assembly of claim 13, wherein the primer is applied in liquid form and is allowed to dry before application of the cement.

16. The assembly of claim 12, wherein the cement comprises a room temperature vulcanizable pourable organopolysiloxane compound.

17. The assembly of claim 16, wherein the cement is applied in liquid form to one of the optical surfaces of the lens elements and is spread as a layer of uniform thickness by pressing the lens elements against each other.

18. A lens assembly comprising:
   a first organic polymer lens element having an optical surface of a predetermined configuration;
   a second organic polymer lens element having an optical surface facing the optical surface of the first lens element and being of a configuration substantially complementary thereto;
   a primer coating comprising an aliphatic polyurethane on the optical surfaces of the first and second lens elements; and
   a substantially uniform layer of room temperature vulcanizable silicone adhesive in contact with the primer coating on said first and second lens elements to provide a stable, optically neutral bond therebetween.

19. The assembly of claim 18, wherein the primer coatings are applied as a colloidal dispersion of an aliphatic polyurethane in an aqueous solution of cellosolve.

20. The assembly of claim 19, wherein the primer coatings comprise about 20% by volume of 2-butoxyethanol and about 80% by volume of water.

21. The assembly of claim 19, wherein the primer is applied in liquid form and is allowed to dry before application of the cement.

22. The assembly of claim 18, wherein the cement comprises a room temperature vulcanizable pourable organopolysiloxane compound.

23. The assembly of claim 22, wherein the cement is applied in liquid form to one of the optical surfaces of the first or second lens elements and is spread as a layer of uniform thickness by pressing the lens elements against each other.

* * * * *